June 24, 1952 E. M. FROST, JR 2,601,272
APPARATUS AND PROCEDURE FOR THE DETERMINATION OF HELIUM IN GASES
Filed June 27, 1947
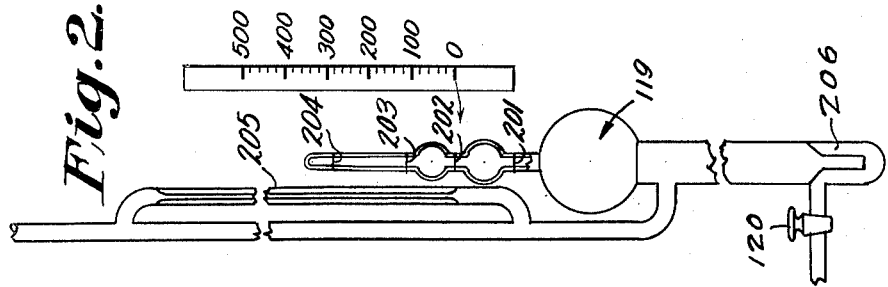
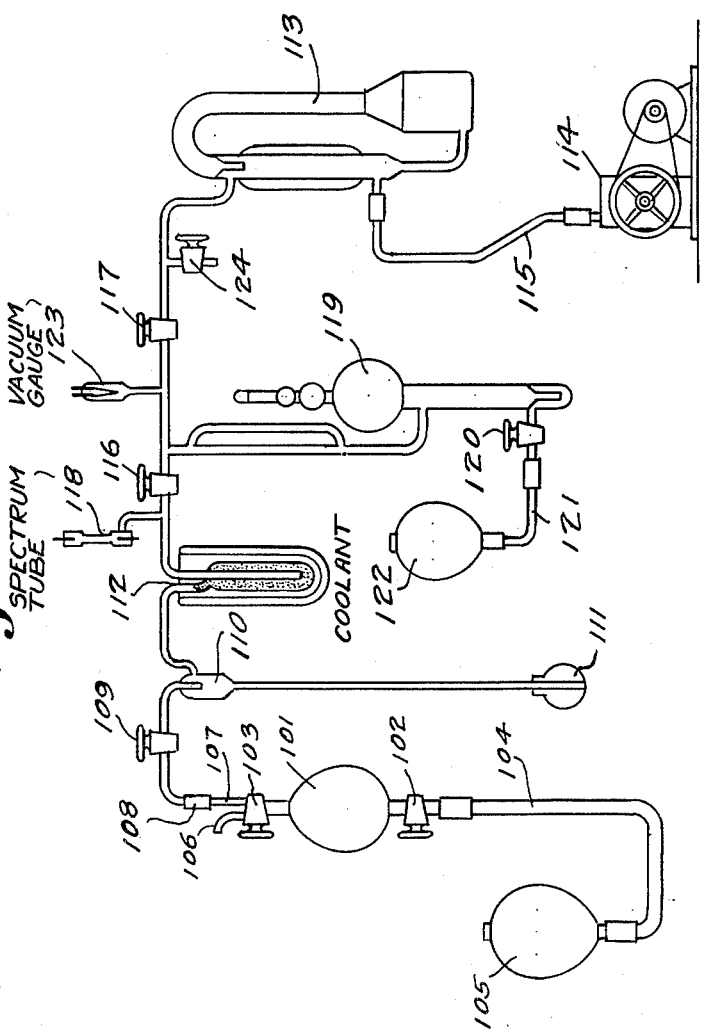
INVENTOR
ELLIS M. FROST, JR.
BY
ATTORNEY Patented June 24, 1952

2,601,272

UNITED STATES PATENT OFFICE 2,601,272

APPARATUS AND PROCEDURE FOR THE DETERMINATION OF HELIUM IN GASES

Ellis M. Frost, Jr., Amarillo, Tex., assignor to the United States of America as represented by the Secretary of Interior Application June 27, 1947, Serial No. 757,784

8 Claims. (Cl. 73—23)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to gas analysis and it particularly relates to a method and apparatus for the determination of helium in gas samples and still more particularly to the determination of helium in natural gas.

It is known that large volumes of all the constituents usually found in natural gas are quantitatively adsorbed on activated cocoanut charcoal that has been cooled to about the temperature of liquid air.

Accordingly, it is an object of this invention to utilize this principle and provide a method and apparatus for determining the helium content of fluids. Other objects and advantages will be apparent or will appear hereinafter.

These objects and advantages are accomplished in accordance with the present invention whereby a gas sample of known volume $V_1$, under known conditions of pressure P and temperature $t$, is transferred to an exhausted analyzer system of fixed volume $V_f$ and confined therein, removing therefrom all non-helium constituents by adsorption on activated coconut charcoal maintained at about the temperature of liquid air; confining a portion of the helium in a sensitive pressure measuring gage and compressing such confined portion to a known volume V; evacuating the helium not confined in the pressure gage; measuring the pressure $P_1$ developed by gas volume V; reestablishing volume $V_f$; expanding the helium confined in V into $V_f$; confining a portion thereof in said pressure gage; compressing said confined portion to a volume $V_2$, equal to volume V; exhausting the unconfined helium now in $V_f$; measuring the pressure $P_2$ developed by the gas volume $V_2$; and from the pressure and volume readings obtained thereby, calculating the helium content of the sample.

The invention accordingly comprises the method and apparatus for helium analysis.

The invention will be made clear by reference to the accompanying drawings forming a part of the specification and in which:

Figure 1 represents schematically a device for quantitatively determining the helium content of gases, and Figure 2 represents a sectional view of a modification of a McLeod gage for measuring the pressures developed by known small volumes of gases.

For a practical embodiment of a device for operation in accordance with the present invention, and referring now to Figure 1, there is illustrated a sample measuring bulb 101, fitted with a two-way stopcock 102 and a three-way stopcock 103. Flexible tubing 104 interconnects the measuring bulb 101 with a leveling bulb 105 via stopcock 102. One arm 106, of stopcock 103, connects the sample measuring bulb 101 with the sample collecting system which is not shown. The other arm 107 connects the sample measuring bulb 101 with the analyzer system by means of flexible tubing 108. The analyzer system as shown comprises a tubing run leading through a stopcock 109 into a constant-volume trap of the barometric type 110, which has a mercury reservoir 111. From the trap 110, the tubing run continues on to an adsorption tube 112, which is filled with activated charcoal and through which the samples must pass before continuing through the system. From adsorption tube 112, the tubing run leads to and connects with the suction side of a vapor diffusion pump 113, which is connected to a backing up pump 114 by flexible tubing 115. Two stopcocks, 116 and 117, are interposed in the tubing run between the adsorption tube 112 and the diffusion pump 113. Tapping into the tubing run between the adsorption tube 112 and stopcock 116 there is a spectrum tube 118. A modified McLeod pressure gage 119 taps into the tubing run between stopcocks 116 and 117. The modified McLeod gage 119 is fitted with a stopcock 120, and connected thereby through flexible tubing 121 to a leveling bulb 122. Also, tapping into this line section or header between stopcocks 116 and 117 is an electrical type vacuum gage 123. Stopcock 124, tapping into the tubing run between stopcock 117 and diffusion pump 113, provides a means for interconnecting the analyzer system with the atmosphere.

The volume of measuring bulb 101 depends on the type of service anticipated. For plant control work requiring precision not greater than about 0.01 percent helium, and with gases containing a maximum of about 5 percent helium, a volume of 100 cc. for bulb 101 is satisfactory. For analysis of samples containing from about 1 to 0.001 percent helium, a volume of 300 cc. has been found satisfactory. A volume of 500 cc. has been used for analyzing samples containing a few ten-thousandths of a percent helium, and a volume of 50 cc. or less for samples containing more than 10 percent helium. Operation is usually simplified when leveling bulb 105 is selected to match the volume of bulb 101.

Sulfur-free rubber tubing 104 is used between the sample measuring bulb 101 and leveling bulb 105 when mercury is used as the confining fluid in order to prevent fouling of the mercury.

The apparatus between stopcock 109 and the vapor diffusion pump 113 is preferably all-glass, one-piece construction—especially where greatest accuracy is desired. Stopcocks 109, 116, 117, and 124 should be precision-ground for high vacuum service.

The glass tubing runs between stopcocks 103 and 109 are butted together and coupled with a sleeve of pure gum-rubber tubing 108. This produces a flexible coupling and readily permits exchange of sample measuring bulbs. Other flexible coupling materials which will not contaminate the system can also be employed.

The volume of trap 110 and the connecting tubing to adsorption tube 112 should be kept relatively small and compact to minimize the volume between stopcock 109 and the charcoal tube 112. Trap 110 and reservoir 111 prevent mercury from getting from bottle 101 into the charcoal tube 112, and also serve as a safety release to prevent development of excessive pressure within the apparatus should tube 112 inadvertently become warm and release adsorbed gases. The length of the leg of trap 110 should at least equal barometric height.

Tube 112 is filled with 16–20 mesh screened coconut charcoal prepared for gas adsorption service. Such charcoal is generally stocked by laboratory supply houses. Fines should be avoided as they may be blown into other parts of the system. The charcoal should be screened just before being placed in the tube, and subsequent manipulations that might create additional fines should be avoided. Tufts of glass wool or plugs made by rolling strips of copper or brass gauze or screen into compact cylindrical shapes can be used as retainers for the charcoal. The adsorption tube 112 should be so constructed that the gases must pass through the charcoal charge before leaving the tube. This is accomplished in the tube 112, shown in Figure 1, by introducing the gases near the top of the tube and having the outlet tube extending into the tube and having its opening at the bottom of the charge. The adsorption tube 112 is cooled by immersion in liquid air, liquid nitrogen, or other cooling means capable of developing temperatures of about minus 175 degrees centigrade or less, and thereby adsorbing the non-helium constituents on the charcoal. Thermos bottles and Dewar flasks of liquid air have been found to be satisfactory cooling means for purposes of the invention.

The spectrum tube 118 is used to verify the complete adsorption of constituents other than helium. It has also been used to confirm the presence of helium. The spectrum tube is kept small and compact to minimize the total volume between the adsorption tube 112 and stopcock 116. Adsorbable gases sometimes get into the spectrum tube and are removed by a process of diffusion back into the charcoal tube. Diffusion is favored by small volumes and compact open connections. One electrode of the spectrum is grounded to the metal frame supporting the apparatus and the frame in turn is grounded to the earth. Failure to ground the frame may result in a high tension shock to the operator when the spectrum tube is excited.

Stopcock 116 is kept far enough away from the adsorption tube 112 so as not to be chilled by vapors from liquid air around the adsorption tube 112.

Gage 119 is a modified McLeod gage fitted with a special compression head. Referring now to Figure 2, a representation of a practical embodiment for operation in accordance with the present invention, there is illustrated the compression head with four inscribed reference lines 201, 202, 203, and 204, corresponding to four progressively smaller volumes into which gas may be compressed prior to measuring the pressure. The total volume above each graduation must be determined precisely by calibration after construction. Suitable graduations for purposes of this invention have been found to be those listed below in Table I; the invention, however, is not limited thereto.

*Table I*

| Total Volume Above | c. c. |
| --- | --- |
| 201 | 5.00 ± 1% |
| 202 | 1.00 ± 5% |
| 203 | 0.200±10% |
| 204 | 0.050±10% |

This construction permits relatively small volumes of helium to be measured with a precision comparable to that in measuring larger volumes. A millimeter scale—not shown in Figure 2—is mounted along the comparison tube 205 for reading the mercury level. The construction shown at the lower end of the gage 206 is desirable in that it provides a trap for the collection of air bubbles and foreign material that may enter the system. Referring now to Figure 1, the rubber tubing 121, connecting stopcock 120 to the leveling bulb 122, should be sturdy and sulfur-free to minimize contamination of the mercury. Leveling bulb 122 is preferably selected to match gage 119 in volume in order to facilitate operation.

The electrical vacuum gage 123 is used to verify the complete exhaustion of the apparatus prior to an analysis and is used to a limited extent to verify pressure equalization during the course of an analysis. The vacuum gage 123, shown in Figure 1, is of the Pirani type, though other models can be so used. A preferred model operates directly from a 110-volt, 60-cycle power supply and utilizes an exhausted comparison cell. This model permits a stable zero of the electrical indicator at zero absolute pressure and gives increasing deflections with increase in absolute pressure.

The vapor diffusion pump 113 and the backing-up pump 114 operate as a unit. The unit must be capable of exhausting the apparatus to an absolute pressure of $10^{-5}$ millimeters mercury or less. Mercury diffusion pumps have been found satisfactory and some of the oil-vapor pumps developed recently should be satisfactory, though precaution should be taken to prevent oil vapors from backing up into the apparatus, particularly into the adsorption tube 112.

The following directions are given for placing the apparatus in operation. Referring now to Figure 1:

Clean and lubricate all the stopcocks. Carbon tetrachloride is satisfactory for cleaning the stopcocks. Tufts of cotton moist with the fluid are swabbed gently through the barrels and around the plugs. Pipe cleaners are satisfactory for cleaning the plug passages and the tubing adjacent to the barrels. Stopcock lubricant of very low vapor pressure is required. So-called high-vacuum lubricant is stocked by various supply houses. In a high-vacuum apparatus such as described herein, it is essential that the stopcocks always be kept clean and well lubricated. Enough lubricant should be smeared onto the plug to produce a uniform transparent film between the plug and barrel when the plug is replaced and worked gently in the barrel, but lubricant should not get into the plug passages or tubing adjacent to the barrel.

Check the oil level in mechanical vacuum pump 114. Clean, fresh oil should be used in the pump.

Place mercury in gage 119 via bulb 122, in bulb 111, and in vapor-diffusion pump 113. Enough mercury should be placed in pump 113 to cover the heater recess to a depth of about 1 centimeter.

Place mercury or water in bottle 101 and bulb 105. If mercury is used as the confining fluid, always keep a drop of water in bottle 101 to insure saturation of the gas sample.

Open stopcocks 116 and 117. Close 109 and 124. Remove any gas bubbles trapped in the bottom tube of gage 119 by first running mercury from 122 into 119 and then from 119 back into 122 to sweep the bubbles into 122; then adjust the mercury level in 119 to a point just below the side arm entrance tube and close 120. Connect the vacuum pump 114 to 113 with heavy wall rubber tubing. Start the mechanical vacuum pump 114. The mercury will rise from bulb 111 towards trap 110 as the apparatus is exhausted. As soon as the mercury in this tube rises to within a centimeter or two of the barometric height, start cooling water through the mercury vapor pump condenser jacket and turn on the vapor pump electrical heater. Caution should be exercised during the above adjustments not to get mercury on the heater, as mercury vapors are very toxic. Without waiting for the mercury-vapor pump to get into normal operation, start heating the charcoal as described in the next paragraph.

The charcoal tube 112 should be heated to about 300° F. for 10 minutes or more while being exhausted by the vacuum pump. Tubular heaters with open central core sections or heat lamps are preferable for this. Near-boiling water has been found acceptable for heating the charcoal, though the charcoal must be kept hot for a longer period. This heating is to drive off gases and vapors that have been adsorbed onto the charcoal and thus place the charcoal in proper condition to proceed with the helium analyses. Heating is continued until virtually all gases that will be given off at the temperature of 300° F. are removed. The release of adsorbed gases is followed by noting the pressure within the apparatus, that is, by comparing the height of mercury from bulb 111 into trap 110 with a barometric height. The progressive release of these gases and vapors will maintain a small absolute pressure within the apparatus. A surprising amount of water may be given off the first time the charcoal is heated. Completion of reactivation of the charcoal is indicated by a diminution in the release of adsorbed gases and vapors and a resulting decrease of absolute pressure. Heating should be continued until the absolute pressure within the apparatus drops to a few millimeters absolute.

By this time the mercury vapor-diffusion pump should be in normal operation, as evidenced by the mercury vaporizing or boiling gently in the bulb, the vapors passing over to and down through the nozzle into the condenser, and the condensed mercury running back into the bulb. During the initial heating of the mercury boiler, gases or vapors initially adsorbed or retained on the glass may be released spasmodically to cause bumping or exaggerated disturbances in the mercury. The initial rate of heating may need to be reduced if these disturbances become excessive to the point of endangering the glassware. These disturbances should not occur after the initial heating. The final rate of heating is adjusted to the point where the vapor pressure within the boiler will hold the level of mercury in the side-arm return tube approximately 1 centimeter above the level of the boiler.

As soon as the pressure within the apparatus has dropped to a few millimeters absolute and the vapor-diffusion pump is in normal operation, the heat is withdrawn from around the charcoal tube and the tube allowed to cool to near-atmospheric temperature.

A thermos container of liquid air or liquid nitrogen is raised slowly around the charcoal tube 112 and adjusted so that the level of liquid stands at a point well above the top of tube 112. The liquid level always should be maintained at approximately the same level above the charcoal tube during analyses. A pint-size wide-mouthed glass thermos bottle, silvered and preferably of pyrex glass, is satisfactory for holding the liquid air or liquid nitrogen.

As soon as the charcoal tube becomes chilled, the pressure within the system should start decreasing and within a short time should reach a pressure of $10^{-5}$ mm. or less. Under this condition the vacuum gage 123 should read zero. The initial reduction of pressure may be somewhat slower, owing to the release of adsorbed gases from the apparatus walls. The low pressure is confirmed by manipulating the McLeod gage. To do this, open stopcock 120 slightly and manipulate leveling bulb 122 so that the mercury rises slowly in the gage until it reaches the top reference line. Close stopcock 120. If the level of the mercury in the side-arm reference tube is not over a millimeter above the level in the compression head, the apparatus is in proper condition to proceed. If the level of the mercury in the side-arm tube exceeds by more than a millimeter the level in the compression tube, further exhausting is necessary. In either instance, reopen stopcock 120 slightly, manipulate the leveling bulb so that the mercury level within the gage falls below the side-arm entrance tube, and reclose the stopcock. Continue exhausting until the gage reading is reduced to 1 millimeter or less.

In manipulating leveling bulb 122, perpetual vigilance must be exercised never to cause mercury to pass over the top of the gage into the header. If mercury should be spilled over into this header and get into the charcoal tube, the apparatus will need be broken down and the mercury removed. This is not a difficult job if glass-blowing talent is available, but could be very disturbing if such talent is not available. As an operating precaution, never leave stopcock 120 open except when readjusting mercury levels, and then always keep the level well under control.

The above procedure places the apparatus in proper condition to proceed with an analysis.

PROCEDURE FOR MAKING AN ANALYSIS

The technique of introducing a sample into the apparatus differs slightly, depending upon whether mercury or water is used as the confining fluid in bottle 101. Mercury is preferable, though the weight and also the cost becomes excessive with the larger bottles. Liquid water must not be allowed to get past 109 into the apparatus during the course of an analysis. If water should get past 109, it may cause an ice plug in the inlet line to the charcoal tube with resulting inability to complete the analysis. Even if an ice plug should not close off the tubing, the water or ice will decrease the free space between 109 and 117 and cause slightly higher pressures than otherwise would prevail. In practice, it has been found necessary not to allow water to get into the tubing between 103 and 109 lest it be swept on into the apparatus while introducing a successive sample. If mercury is used in 101, small volumes may be purged through 103, the connecting tubing, and 109 without hazard.

If mercury is used in 101, displace all gas from 101 to the atmosphere via 103, rotate the stopcock plug to communicate with 109, purge a small volume of mercury through the connecting tubing and 109, and close 109, leaving the connecting tubing between 103 and 109 full of mercury. Readjust 103 to communicate with the sample inlet line, connect the sample transfer bottle containing the sample, and draw sample into 101 to completely fill the bottle to 102 at atmospheric pressure. Do not leave any gas below 102. The pressure can be adjusted to atmospheric by bringing together the level of water in the transfer bottle and the leveling bottle attached to the transfer bottle before closing 103.

Rotate 103 to communicate with 109, open 102, close 116, and open 109 very slightly to allow the sample to be drawn slowly into the apparatus.

The rate of boiling of the liquid air often increases momentarily while the sample is being drawn into the charcoal tube. Draw all the gas sample into the apparatus, flush a small amount of mercury through 109, then close 109 and 103.

If water is used as the confining fluid in 101, it cannot be used to flush the connecting tubing between 103 and 109, and this tubing normally is left full of gas. This tubing must be swept out with sample just before each analysis.

In this latter procedure all gas is expelled from 101 into the atmosphere, and the gas sample is drawn in from the transfer bottle. Stopcock 103 is rotated to communicate with 109, and 109 is opened momentarily to draw enough gas through to sweep this tubing. Stopcock 109 then is closed. The vacuum pumps will remove any helium entering with this sweep gas. Bottle 101 is filled with gas sample at atmospheric pressure, 103 rotated to communicate with 109, 102 opened, 116 closed, and 109 opened very slightly to permit the sample to enter into the apparatus. The level of water in 101 is followed closely, and 109 closed as soon as the water level reaches 103. This leaves the tubing between 103 and 109 filled with gas.

Either of the above procedures is satisfactory for introducing the sample into the apparatus.

Allow the apparatus to stand for approximately 3 minutes to insure complete adsorption of all constituents other than helium.

Excite the spectrum tube 118 with a high-tension coil. Pure helium will be evidenced by a gold or pumpkin-yellow color in the tube. Water vapor will cause the color to be red, nitrogen will cause it to be purple, and mercury will cause it to be greenish. A greenish color sometimes is visible on the inner glass surface under conditions of high vacuum, but this greenish color on the glass is not to be confused with a greenish color within the tube due to the presence of gas. Relatively small amounts of any of these impurities present in the tube will screen the gold color of helium. Appearance of the gold color in the tube usually is sufficient verification of the presence of pure helium. Further confirmation may be had by examining the excited tube with a spectroscope.

If the helium content of the sample is sufficiently low, no color will show in the spectrum tube.

Close stopcock 117, open 116, and allow approximately one minute for pressure to equalize between 109 and 117. Then open 120 slightly and manipulate bulb 122 to cause the mercury to rise slowly in gage 119. Normally it is not necessary to handle bulb 122 at this stage of the operations, as the relatively high vacuum in the apparatus will draw the mercury up into gage 119. Warning again is given to follow the mercury level closely and not allow mercury to spill over from the gage into the header. With the apparatus shown in Figure 1 and with 122 in a ring support near the bottom of the supporting frame, the distance from the mercury level in 122 to the top of side-arm tube of gage 119 exceeds a barometric height, so mercury will not spill over unless 122 is lifted.

After the mercury rises enough to close off the side-arm entrance tube to gage 119, open 117 and permit the apparatus, except for gage 119, to become exhausted. The progress of this exhaustion is followed by noting the electrical vacuum gage 123. As soon as this gage indicates a pressure of 1 micron or less, bring the mercury level to the highest possible reference mark without causing the mercury to rise out of the capillary comparison tube, and close 120. Note the difference in level of the mercury in the compression tube of gage 119 and in the capillary comparison tube. Record this as $P_1$. Close 117, open 120 slightly, manipulate 122 to cause the mercury to fall below the level of the side-arm entrance tube to 119, and reclose 120. This allows the helium just trapped in the gage head to reexpand back into the apparatus between 109 and 117. Allow approximately one minute for pressure to equalize. Then remanipulate 120, 122, and 117 in the same sequence as in determining $P_1$, and make a second pressure reading from the same reference mark. Record this as $P_2$. This completes the apparatus manipulations. Lower the mercury in 119 to permit exhaustion of the apparatus for a succeeding analysis while calculations are being made.

CALCULATION OF PERCENTAGE OF HELIUM IN SAMPLE

The pressure reading $P_1$ and the known volume V, above the graduation mark permit calculation of the volume that would be occupied by the helium trapped in the pump head if this helium were at the partial pressure and temperature of dry gas in the initial sample in bottle 101. This helium is only a part of the helium introduced into the apparatus with the original sample. This known volume of helium, equal to $V_2$, when expanded back into the apparatus caused pressure $P_2$. If the known volume $V_2$ caused pressure $P_2$, the helium content of the original volume $V_1$ causing initial pressure $P_1$ may be calculated. The ratio which this volume bars to the original sample then may be calculated. The following example illustrates the calculations.

*Example of calculation*

The volume $V_1$ of sample bottle 101 is 300 cc. The barometric pressure is 700 mm. mercury. The temperature is 80° F. The pressure $P_1$ is 275 mm. and pressure $P_2$ is 140 mm. The volume V of the gage head above the reference mark is 5.00 cc.

The vapor pressure of water at 80° F. is 1.0314 inches or 26.2 mm. mercury. Accordingly, the partial pressure of dry gas in 101 is $$700 - 26.2 = 673.8 \text{ mm. mercury}$$

The analysis is completed so quickly that no temperature factor other than the vapor pressure of water need be considered.

The 5.00 cc. helium at 275 mm. will occupy $5.00 \times 275/673.8 = 2.04$ cc. if at the partial pressure of dry gas in 101. If 2.04 cc. causes a pressure ($P_2$) of 140 mm., the helium content of the original sample volume $V_1$ that will cause the original pressure ($P_1$) of 275 mm. will be: Helium content of $V_1 = 2.04 \times 275/140 = 4.01$ cc., or by combining equations, helium content of $$V_1 = \frac{VP_1^2}{(P-k_t)P_2}$$

The percent helium in the original sample is:

$$\frac{4.01 \times 100}{300} = 1.34 \text{ percent by volume}$$

Charts may be prepared easily for use in the analysis procedure. These charts are graphs of McLeod gage reading vs. percent helium. The analysis procedure is carried through as in the preceding section until the first McLeod gage reading $P_1$ is obtained. Reference then is made to the calibration chart. The percent helium corresponding to this gage pressure is read directly from the chart.

The graphs are made by expanding into the apparatus known volumes of pure helium, measuring the resultant McLeod gage pressure, calculating the ratios the volumes of helium bear to the standard sample volume, and plotting the gage readings vs the helium percentages. The graphs must be prepared with care for each individual apparatus.

A procedure recommended to take the apparatus out of service is: Remove the liquid air around 112, turn off the heater to pump 113. Open 116 and 117. Adjust the mercury level in 119 to a point below the side arm entrance tube and close 120. As soon as the mercury in 113 stops boiling open 124 slightly and turn off pump 114. Turn off gage 123. Air entering through 124 will bring the apparatus to atmospheric pressure.

The report of investigations, entitled "Improved Apparatus and Procedure for the Determination of Helium in Natural Gas" (R. I. 3899) by E. M. Frost, Jr., issued by the Bureau of Mines, U. S. Department of the Interior, can be consulted for detailed instructions for analysis procedure using calibration charts. This report also detailed drawings for the construction of the apparatus herein described which has been employed successfully in the determination of the helium content of numerous gaseous systems.

Various changes can be made in the details and equipment described without departing from the spirit and scope of the invention.

What is claimed is:

1. The method for the quantitative determination of helium in a sample of known volume of a helium containing gas mixture under known conditions of temperature and pressure which comprises the steps of adsorbing non-helium components from said gas mixture; isolating the residual helium in a system of constant volume; confining a fixed portion of the isolated helium at the pressure of the isolated system; compressing said confined portion to a specific volume; measuring the pressure developed against a vacuum by said compressed specific volume; expanding said specific volume to the volume of the originally isolated system; confining therefrom a second portion of helium at the pressure of the expanded helium and equal to the portion confined for the first compression; compressing said second confined portion to the same specific volume to which said first compression was made; and measuring the pressure developed against a vacuum by said compressed second portion of helium whereby the helium content of the gas mixture can be calculated by the equation:

$$\text{Helium content of } V_1 = \frac{VP_1^2}{(P-k_t)P_2}$$

wherein:

$V_1$ is the volume of original gas mixture,
V is the specific volume to which the helium was compressed,
P is the pressure of the original gas sample,
$P_1$ is the pressure developed by the first compression,
$P_2$ is the pressure developed by the second compression,
$k_t$ is the vapor pressure of water at temperature $t$, the temperature of the orginal gas sample.

2. The method for the quantitative determination of helium in a sample of known volume of a helium containing gas mixture under known conditions of temperature and pressure confined in a previously evacuated system which comprises the steps of passing said gas sample through activated coconut charcoal cooled to at least the temperature of liquid air; isolating the residual helium in a system of constant volume; confining a fixed portion of the isolated helium at the pressure of the isolated system; compressing said confined portion to a specific volume; measuring the pressure developed against a vacuum by said compressed specific volume; expanding said specific volume to the volume of the originally isolated system; confining therefrom a second portion of helium at the pressure of the expanded helium and equal to the portion confined for the first compression; compressing said second confined portion to the same specific volume to which said first compression was made; and measuring the pressure developed against a vacuum by said compressed second portion of helium whereby the helium content of the gas mixture can be calculated by the equation:

$$\text{Helium content of } V_1 = \frac{VP_1^2}{(P-k_t)P_2}$$

wherein:

$V_1$ is the volume of original gas mixture,
V is the specific volume to which the helium was compressed,
P is the pressure of the original gas sample,
$P_1$ is the pressure developed by the first compression,
$P_2$ is the pressure developed by the second compression,
$k_t$ is the vapor pressure of water at temperature $t$, the temperature of the original gas sample.

3. A device for measuring the quantity of helium gas in a sample of a helium containing gas mixture comprising a first chamber for receiving a fixed volume of said gas mixture; a second chamber communicating therewith, said second chamber containing an adsorbent capable of removing non-helium constituents from said gas mixture; a valve positioned in the communicating duct between said first chamber and said second chamber; a header communicating with said second chamber; a third chamber for receiving a portion of the unadsorbed gas, said third chamber communicating with said header; a valve positioned in the communicating duct between said second chamber and said header and operable to open and close said duct; means for isolating the sample of gas in said third chamber; means for measuring the pressure of said isolated portion of gas; vacuum producing means communicating with said header; and a valve positioned in the communicating duct between said header and said vacuum producing means.

4. A device for measuring the quantity of helium gas in a sample of a helium containing gas mixture comprising a first chamber for receiving a fixed volume of said gas mixture; a second chamber communicating therewith, said second chamber containing an adsorbent capable of removing non-helium constituents from said gas mixture; a valve positioned in the communicating duct between said first chamber and said second chamber; a header communicating with said second chamber; a McLeod pressure gage for receiving a portion of the unadsorbed gas communicating with said header; a valve positioned in the communicating duct between said second chamber and said header and operable to open and close said duct; vacuum producing means communicating with said header and a valve positioned in the communicating duct between said header and said vacuum producing means.

5. A device for measuring the quantity of helium gas in a sample of a helium containing gas mixture comprising a first chamber for receiving a fixed volume of said gas mixture; a second chamber communicating therewith, said second chamber containing an adsorbent capable of removing non-helium constituents from said gas mixture; a valve positioned in the communicating duct between said first chamber and said second chamber; a header communicating with said second chamber; a third chamber for receiving a portion of the unadsorbed gas, said third chamber communicating with said header; a valve positioned in the communicating duct between said second chamber and said header and operable to open and close said duct; means for isolating the sample of gas in said third chamber; means for measuring the pressure of said isolated portion of gas; a vacuum measuring gage communicating with said third chamber and with said header; vacuum producing means communicating with said header; and a valve positioned in the communicating duct between said vacuum producing means and said header.

6. A device for measuring the quantity of helium gas in a sample of a helium containing gas mixture comprising a first chamber for receiving a fixed volume of said gas mixture; a second chamber communicating therewith, said second chamber containing an adsorbent capable of removing non-helium constituents from said gas mixture; a valve positioned in the communicating duct between said first chamber and said second chamber; a header communicating with said second chamber; a McLeod pressure gage for receiving a portion of the unadsorbed gas communicating with said header; a valve positioned in the communicating duct between said second chamber and said header and operable to open and close said duct; a vacuum measuring gage communicating with said McLeod gage and header; vacuum producing means communicating with said header; and a valve positioned in the communicating duct between said vacuum producing means and header.

7. A device for measuring the quantity of helium gas in a sample of a helium containing gas mixture comprising a first chamber for receiving a fixed volume of said gas mixture; a barometric constant-volume trap communicating with said first chamber; a valve positioned in the communicating duct between said first chamber and said trap; a second chamber communicating with said trap, said second chamber containing an adsorbent capable of removing non-helium constituents from said gas mixture; a header communicating with said second chamber; a third chamber for receiving a portion of the unadsorbed gas, said third chamber communicating with said header; a valve positioned in the communicating duct between said second chamber and said header and operable to open and close said duct; means for isolating the sample of gas in said third chamber; means for measuring the pressure of said isolated portion of gas; vacuum producing means communicating with said header; and a valve positioned in the communicating duct between said header and said vacuum producing means.

8. A device for measuring the quantity of helium gas in a sample of a helium containing gas mixture comprising a first chamber for receiving a fixed volume of said gas mixture; a barometric constant-volume trap communicating with said first chamber; a valve positioned in the communicating duct between said first chamber and said trap; a second chamber communicating with said trap, said second chamber containing an adsorbent capable of removing non-helium constituents from said gas mixture; a header communicating with said second chamber; a McLeod pressure gage for receiving a portion of the unadsorbed gas communicating with said header; a valve positioned in the communicating duct between said second chamber and said header and operable to open and close said duct; vacuum producing means communicating with said header and a valve positioned in the communicating duct between said header and said vacuum producing means.

ELLIS M. FROST, Jr.

REFERENCES CITED

The following references are of record in the file of this patent:

UNITED STATES PATENTS

| Number | Name | Date |
|---|---|---|
| 1,934,075 | Lewis | Nov. 7, 1933 |
| 2,212,681 | Dunn | Aug. 27, 1940 |
| 2,379,045 | Sturgis | Jan. 26, 1945 |

OTHER REFERENCES

Journal of Americal Chemical Society, Publication, Volume 48, July 1926, pp. 1850–57. Article by Arthur F. Benton.